United States Patent
Schubert et al.

(10) Patent No.: US 11,727,171 B2
(45) Date of Patent: Aug. 15, 2023

(54) TECHNIQUES FOR USING CONVEX FABRICATION LOSS FUNCTIONS DURING AN INVERSE DESIGN PROCESS TO OBTAIN FABRICABLE DESIGNS

(71) Applicant: X Development LLC, Mountain View, CA (US)

(72) Inventors: Martin Schubert, Mountain View, CA (US); David Alexander, Sunnyvale, CA (US)

(73) Assignee: X Development LLC, Mountain View, CA (US)

( * ) Notice: Subject to any disclaimer, the term of this patent is extended or adjusted under 35 U.S.C. 154(b) by 169 days.

(21) Appl. No.: 17/037,226

(22) Filed: Sep. 29, 2020

(65) Prior Publication Data

US 2022/0100921 A1     Mar. 31, 2022

(51) Int. Cl.
*G06F 30/20*     (2020.01)

(52) U.S. Cl.
CPC .................................. *G06F 30/20* (2020.01)

(58) Field of Classification Search
CPC ...... G06F 30/20; G06F 30/23; G06F 2119/18; G02B 27/0172; Y02P 90/02
See application file for complete search history.

(56) References Cited

U.S. PATENT DOCUMENTS

| | | |
|---|---|---|
| 6,957,402 B2 | 10/2005 | Templeton et al. |
| 2007/0256046 A1 | 11/2007 | Pikus et al. |
| 2016/0012176 A1* | 1/2016 | Liu .................. G02B 6/125 716/112 |
| 2019/0065630 A1* | 2/2019 | Kim ................. H01L 27/0207 |
| 2020/0184137 A1 | 6/2020 | Tsutsui et al. |
| 2022/0100098 A1* | 3/2022 | Tel ................. G03F 7/70658 |

FOREIGN PATENT DOCUMENTS

WO     2012115912 A2     8/2012

OTHER PUBLICATIONS

Tiankuang Zhou, Lu Fang, Tao Yan, Jiamin Wu, Yipeng Li, Jingtao Fan, Huaqiang Wu, Xing Lin, and Qionghai Dai, "In situ optical backpropagation training of diffractive optical neural networks," Photon. Res. 8, 940-953 (2020) (Year: 2020).*

Su L, Vercruysse D, Skarda J, Sapra NV, Petykiewicz JA, Vučković J. Nanophotonic inverse design with SPINS: Software architecture and practical considerations. Applied Physics Reviews. Mar. 10, 2020;7(1):011407. (Year: 2020).*

(Continued)

*Primary Examiner* — Eunhee Kim
(74) *Attorney, Agent, or Firm* — Christensen O'Connor Johnson Kindness PLLC

(57) ABSTRACT

In some embodiments, techniques for creating a fabricable segmented design for a physical device are provided. A computing system receives a design specification. The computing system generates a proposed segmented design based on the design specification. The computing system determines one or more fabricable segmented designs based on the proposed segmented design. The computing system determines an overall fabrication loss value based on the one or more fabricable segmented designs. The computing system backpropagates a gradient of the overall fabrication loss value to create an updated design specification.

18 Claims, 4 Drawing Sheets

(56) References Cited

OTHER PUBLICATIONS

Jiang J, Fan JA. Dataless training of generative models for the inverse design of metasurfaces. arXiv preprint arXiv:1906.07843. Jun. 2019;401:402. (Year: 2019).*

A. Y. Piggott, et al., "Fabrication-constrained nanophotonic inverse design," Scientific Reports 7:17786, www.nature.com/scientificreports/ <https://doi.org/10.1038/s41598-017-01939-2>, May 11, 2017, pp. 1-7.

International Search Report and Written Opinion, dated Dec. 8, 2021, in corresponding International Patent Application No. PCT/US2021/047595, 9 pages.

* cited by examiner

TECHNIQUES FOR USING CONVEX FABRICATION LOSS FUNCTIONS DURING AN INVERSE DESIGN PROCESS TO OBTAIN FABRICABLE DESIGNS

TECHNICAL FIELD

This disclosure relates generally to designing and manufacturing physical devices, and in particular but not exclusively, relates to inverse design of optical and electromagnetic devices.

BACKGROUND

Optical and electromagnetic devices are devices that create, manipulate, propagate, and/or measure electromagnetic radiation. Their applications vary broadly and include, but are not limited to, acousto-optic modulators, optical modulators, optical ring resonators, distributed Bragg reflectors, lasers, lenses, transistors, waveguides, antennas, and the like. Design of these devices is sometimes determined through a simple guess and check method in which a small number of design parameters of a pre-determined design are adjusted for suitability to a particular application. However, in actuality, these devices may have design parameters ranging from hundreds all the way to many billions, dependent on the device size and functionality. As functionality of these optical and electromagnetic devices is increased and manufacturing improves to allow for smaller device feature sizes, it becomes increasingly important to take full advantage of these improvements via optimized device design.

Though some techniques for generating device designs exist, some of these techniques simply generate device designs without considering whether the generated designs can be fabricated. A need exists for techniques for measuring and verifying the fabricability of device designs.

BRIEF SUMMARY

In some embodiments, a non-transitory computer-readable medium is provided. The computer-readable medium has logic stored thereon that, in response to execution by one or more processors of a computing system, causes the computing system to perform actions for creating a fabricable segmented design for a physical device, the actions comprising: receiving, by the computing system, a design specification; generating, by the computing system, a proposed segmented design based on the design specification; determining, by the computing system, one or more fabricable segmented designs based on the proposed segmented design; determining, by the computing system, an overall fabrication loss value based on the one or more fabricable segmented designs; and backpropagating, by the computing system, a gradient of the overall fabrication loss value to create an updated design specification.

In some embodiments, a method of creating a fabricable segmented design for a physical device is provided. A computing system receives a design specification. The computing system generates a proposed segmented design based on the design specification. The computing system determines one or more fabricable segmented designs based on the proposed segmented design. The computing system determines an overall fabrication loss value based on the one or more fabricable segmented designs. The computing system backpropagates a gradient of the overall fabrication loss value to create an updated design specification.

BRIEF DESCRIPTION OF THE SEVERAL VIEWS OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described. To easily identify the discussion of any particular element or act, the most significant digit or digits in a reference number refer to the figure number in which that element is first introduced.

DETAILED DESCRIPTION

Figure 1A:
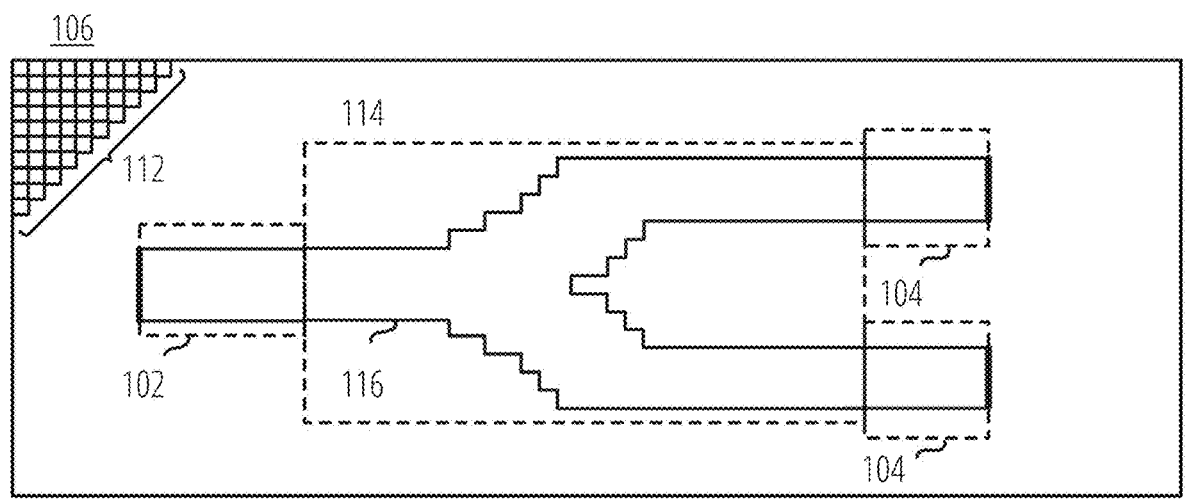
FIG. 1A illustrates a demonstrative simulated environment describing a photonic integrated circuit, in accordance with an embodiment of the present disclosure.
Figure 1B:
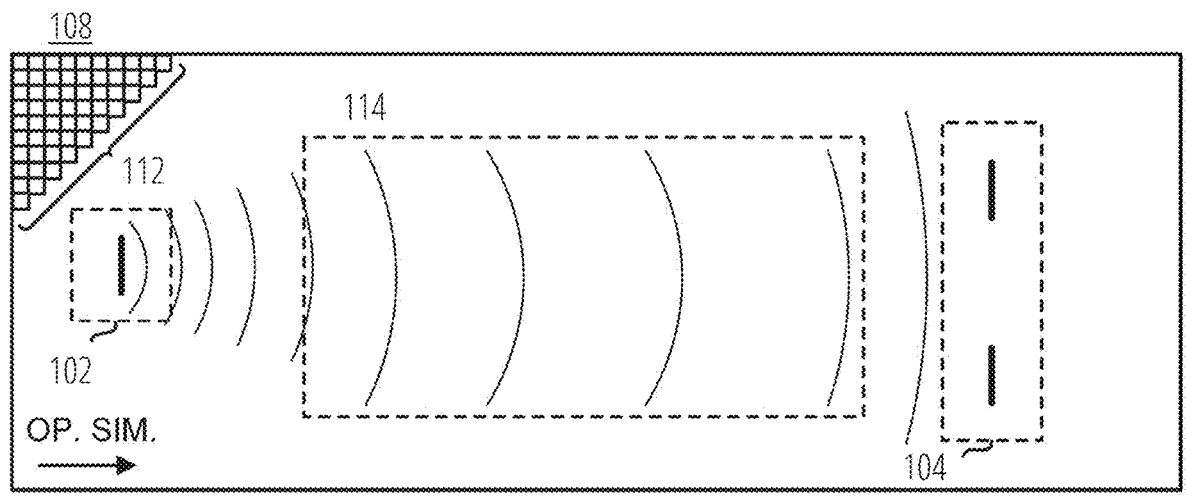
FIG. 1B illustrates an example operational simulation of a photonic integrated circuit, in accordance with an embodiment of the present disclosure.
Figure 1C:
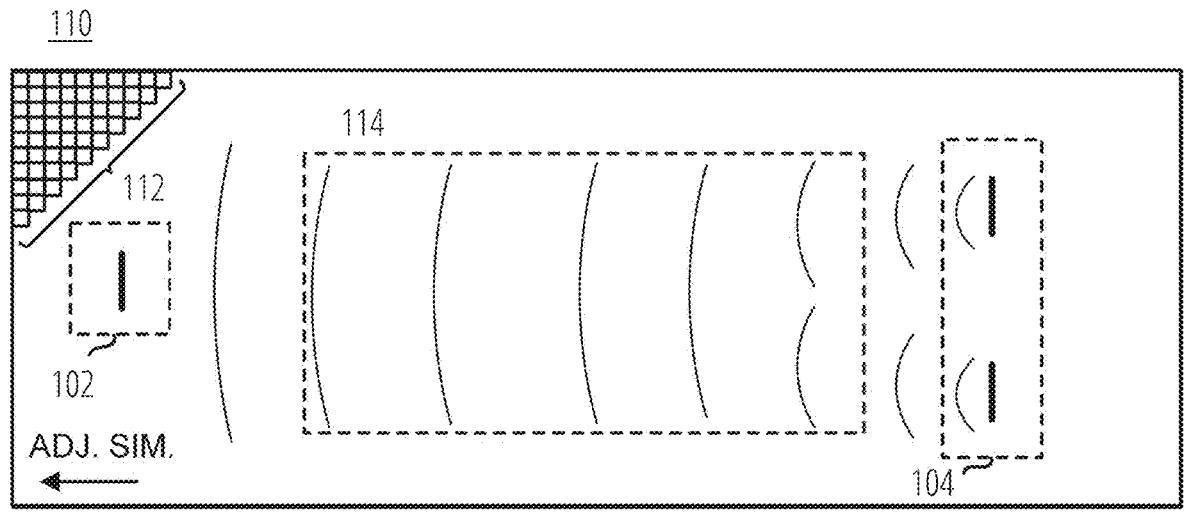
FIG. 1C illustrates an example adjoint simulation within the simulated environment by backpropagating a loss value, in accordance with an embodiment of the present disclosure.

FIG. 1A-FIG. 1C respectively illustrate an initial set up of a simulated environment describing a photonic device, performing an operational simulation of the photonic device in response to an excitation source within a simulated environment, and performing an adjoint simulation of the photonic device within a simulated environment. As illustrated in FIG. 1A-FIG. 1C, simulated environment is represented in two-dimensions. However, it is appreciated that other dimensionality (e.g., 3-dimensional space) may also be used to describe simulated environment and the photonic device. In some embodiments, optimization of structural parameters of the photonic device illustrated in FIG. 1A-FIG. 1C may be achieved via an inverse design process including, inter alia, simulations (e.g., operational simulations and adjoint simulations) that utilize a finite-difference time-domain (FDTD) method to model the field response (e.g., electric and magnetic field) to an excitation source.

FIG. 1A illustrates a demonstrative simulated environment 106 describing a photonic integrated circuit (i.e., a photonic device such as a waveguide, demultiplexer, and the like), in accordance with an embodiment of the present disclosure. More specifically, in response to receiving an initial description of a photonic device defined by one or more structural parameters (e.g., an input design), a system configures a simulated environment 106 to be representative of the photonic device. As illustrated, the simulated environment 106 (and subsequently the photonic device) is described by a plurality of segments 112, which represent individual elements (i.e., discretized) of the two-dimensional (or other dimensionality) space. Each of the segments 112 is illustrated as two-dimensional squares; however, it is appreciated that the segments may be represented as cubes or other shapes in three-dimensional space. It is appreciated that the specific shape and dimensionality of the plurality of segments 112 may be adjusted dependent on the simulated environment 106 and photonic device (or other physical device) being simulated. It is further noted that only a portion of the plurality of segments 112 are illustrated to avoid obscuring other aspects of the simulated environment 106.

Each of the plurality of segments 112 may be associated with a structural value, a field value, and a source value. Collectively, the structural values of the simulated environment 106 describe the structural parameters of the photonic device. In one embodiment, the structural values may correspond to a relative permittivity, permeability, and/or refractive index that collectively describe structural (i.e., material) boundaries or interfaces of the photonic device. For example, an interface 116 is representative of where relative permittivity changes within the simulated environment 106 and may define a boundary of the photonic device where a first material meets or otherwise interfaces with a second material. The field value describes the field (or loss) response that is calculated (e.g., via Maxwell's equations) in response to an excitation source described by the source value. The field response, for example, may correspond to a vector describing the electric and/or magnetic fields (e.g., in one or more orthogonal directions) at a particular time step for each of the plurality of segments 112. Thus, the field response may be based, at least in part, on the structural parameters of the photonic device and the excitation source.

In the illustrated embodiment, the photonic device corresponds to an optical demultiplexer having a design region 114, in which structural parameters of the physical device may be updated or otherwise revised. More specifically, through an inverse design process, iterative gradient-based optimization of a loss metric determined from a loss function is performed to generate a design of the photonic device that functionally causes a multi-channel optical signal to be demultiplexed and guided from input port 102 to a corresponding one of the output ports 104. Thus, input port 102 of the photonic device corresponds to a location of an excitation source to provide an output (e.g., a Gaussian pulse, a wave, a waveguide mode response, and the like). The output of the excitation source interacts with the photonic device based on the structural parameters (e.g., an electromagnetic wave corresponding to the excitation source may be perturbed, retransmitted, attenuated, refracted, reflected, diffracted, scattered, absorbed, dispersed, amplified, or otherwise as the wave propagates through the photonic device within simulated environment 106). In other words, the excitation source may cause the field response of the photonic device to change, which is dependent on the underlying physics governing the physical domain and the structural parameters of the photonic device. The excitation source originates or is otherwise proximate to input port 102 and is positioned to propagate (or otherwise influence the field values of the plurality of segment) through the design region 114 towards output ports 104 of the photonic device. In the illustrated embodiment, the input port 102 and output ports 104 are positioned outside of the design region 114. In other words, in the illustrated embodiment, only a portion of the structural parameters of the photonic device is optimizable.

However, in other embodiments, the entirety of the photonic device may be placed within the design region 114 such that the structural parameters may represent any portion or the entirety of the design of the photonic device. The electric and magnetic fields within the simulated environment 106 (and subsequently the photonic device) may change (e.g., represented by field values of the individual segment that collectively correspond to the field response of the simulated environment) in response to the excitation source. The output ports 104 of the optical demultiplexer may be used for determining a performance metric of the photonic device in response to the excitation source (e.g., power transmission from input port 102 to a specific one of the output ports 104). The initial description of the photonic device, including initial structural parameters, excitation source, performance parameters or metrics, and other parameters describing the photonic device, may be received by a system and used to configure the simulated environment 106 for performing a first-principles based simulation of the photonic device. These specific values and parameters may be defined directly by a user, indirectly (e.g., by a system culling pre-determined values stored in a memory, local storage, or remote resources), or a combination thereof.

FIG. 1B illustrates an operational simulation of the photonic device in response to an excitation source within simulated environment 108, in accordance with various aspects of the present disclosure. In the illustrated embodiment, the photonic device is an optical demultiplexer structured to optically separate each of a plurality of distinct wavelength channels included in a multi-channel optical signal received at input port 102 and respectively guide each of the plurality of distinct wavelength channels to a corresponding one of the plurality of output ports 104. The excitation source may be selected (randomly or otherwise) from the plurality of distinct wavelength channels and originates at input port 102 having a specified spatial, phase, and/or temporal profile. The operational simulation occurs over a plurality of time steps, including the illustrated time step. When performing the operational simulation, changes to the field response (e.g., the field value) for each of the plurality of segments 112 are incrementally updated in response to the excitation source over the plurality of time steps. The changes in the field response at a particular time step are based, at least in part, on the structural parameters, the excitation source, and the field response of the simulated environment 110 at the immediately prior time step included in the plurality of time steps. Similarly, in some embodiments the source value of the plurality of segments 112 is updated (e.g., based on the spatial profile and/or temporal profile describing the excitation source). It is appreciated that the operational simulation is incremental and that the field values (and source values) of the simulated environment 110 are updated incrementally at each time step as time moves forward for each of the plurality of time steps during the operational simulation. It is further noted that in some embodiments, the update is an iterative process and that the update of each field and source value is based, at least in part, on the previous update of each field and source value.

Once the operational simulation reaches a steady state (e.g., changes to the field values in response to the excitation source substantially stabilize or reduce to negligible values) or otherwise concludes, one or more performance metrics may be determined. In some embodiments, the performance metric corresponds to the power transmission at a corresponding one of the output ports 104 mapped to the distinct wavelength channel being simulated by the excitation source. In other words, in some embodiments, the performance metric represents power (at one or more frequencies of interest) in the target mode shape at the specific locations of the output ports 104. A loss value or metric of the input design (e.g., the initial design and/or any refined design in which the structural parameters have been updated) based, at least in part, on the performance metric may be determined via a loss function. The loss metric, in conjunction with an adjoint simulation, may be utilized to determine a structural gradient (e.g., influence of structural parameters on loss metric) for updating or otherwise revising the structural parameters to reduce the loss metric (i.e. increase the performance metric). It is noted that the loss metric may be further based on a fabrication loss value that is utilized to enforce a minimum feature size or other fabricability constraints of the photonic device to promote fabricability of the device.

FIG. 1C illustrates an example adjoint simulation within simulated environment 110 by backpropagating a loss metric, in accordance with various aspects of the present disclosure. More specifically, the adjoint simulation is a time-backwards simulation in which a loss metric is treated as an excitation source that interacts with the photonic device and causes a loss response. In other words, an adjoint (or virtual source) based on the loss metric is placed at the output region (e.g., output ports 104) or other location that corresponds to a location used when determining the performance metric. The adjoint source(s) is then treated as a physical stimuli or an excitation source during the adjoint simulation. A loss response of the simulated environment 110 is computed for each of the plurality of time steps (e.g., backwards in time) in response to the adjoint source. The loss response collectively refers to loss values of the plurality of segment that are incrementally updated in response to the adjoint source over the plurality of time steps. The change in loss response based on the loss metric may correspond to a loss gradient, which is indicative of how changes in the field response of the physical device influence the loss metric. The loss gradient and the field gradient may be combined in the appropriate way to determine a structural gradient of the photonic device/simulated environment (e.g., how changes in the structural parameters of the photonic device within the simulated environment influence the loss metric). Once the structural gradient of a particular cycle (e.g., operational and adjoint simulation) is known, the structural parameters may be updated to reduce the loss metric and generate a revised description or design of the photonic device.

In some embodiments, iterative cycles of performing the operational simulation, and adjoint simulation, determining the structural gradient, and updating the structural parameters to reduce the loss metric are performed successively as part of an inverse design process that utilizes iterative gradient-based optimization. An optimization scheme such as gradient descent may be utilized to determine specific amounts or degrees of changes to the structural parameters of the photonic device to incrementally reduce the loss metric. More specifically, after each cycle the structural parameters are updated (e.g., optimized) to reduce the loss metric. The operational simulation, adjoint simulation, and updating the structural parameters are iteratively repeated until the loss metric substantially converges or is otherwise below or within a threshold value or range such that the photonic device provides the desired performed while maintaining fabricability.

Figure 2:
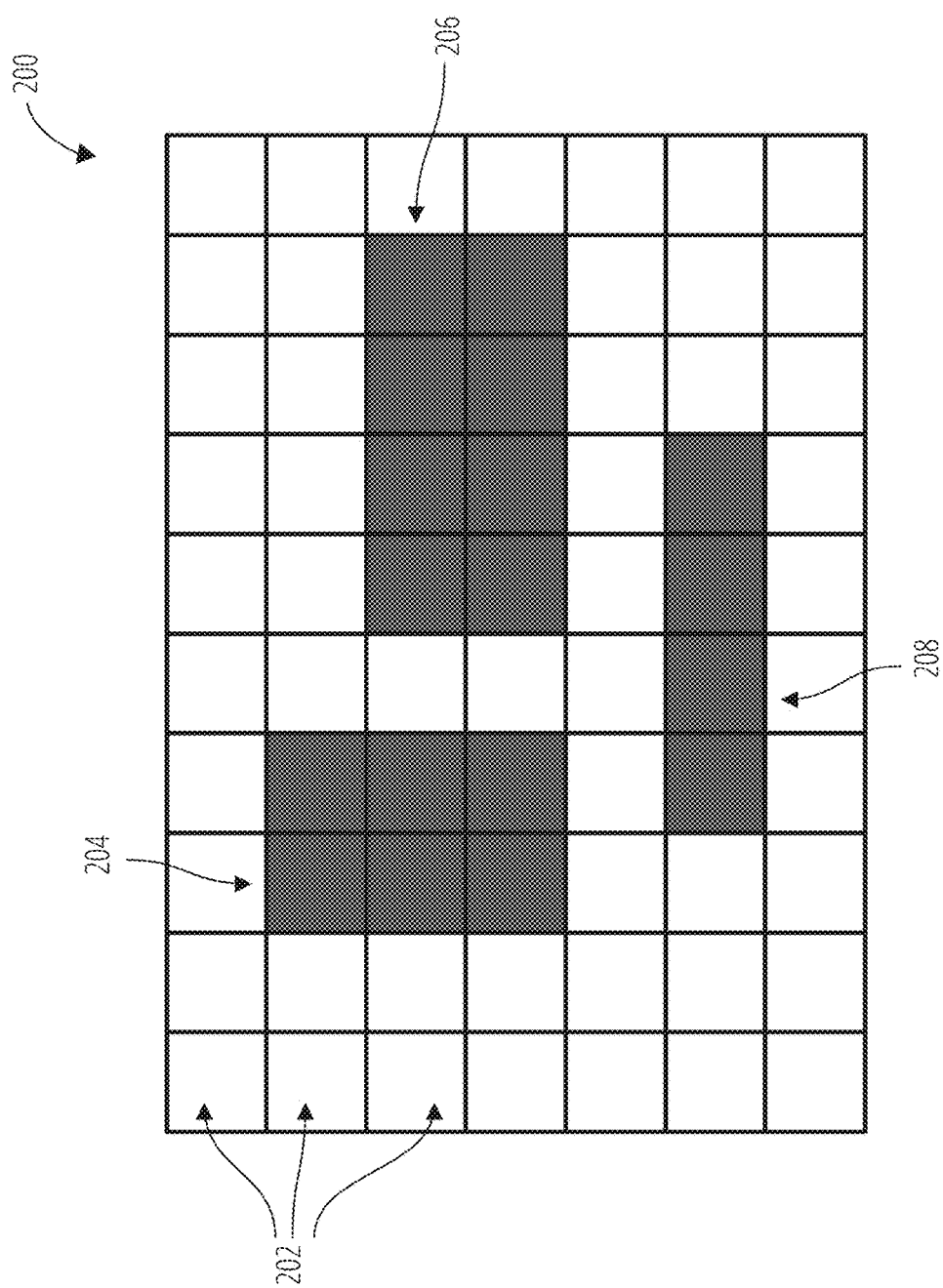
FIG. 2 is a schematic drawing that illustrates a non-limiting example embodiment of a segmented design according to various aspects of the present disclosure.

FIG. 2 is a schematic drawing that illustrates a non-limiting example embodiment of a segmented design according to various aspects of the present disclosure. The segmented design 200 is a non-limiting example of content suitable for insertion in the design region 114 described above (though not drawn to the scale or with the same granularity of segmentation). As shown, the segmented design 200 includes a plurality of segments 202 laid out in a two-dimensional grid. Each of the segments 202 represents a location in the proposed segmented design that can either include a material or not include a material. As illustrated, segments that are white indicate a lack of the material, and segments that are dark (such as the first pattern 204, the second pattern 206, and the third pattern 208, indicate a presence of the material. For example, in a photolithography process, segments that are white may represent locations that are not exposed, and segments that are dark may represent locations that are exposed during the photolithography process. As another example, in an additive manufacturing process (e.g., a 3-D printer), segments that are white may represent locations that do not include material, and segments that are dark may represent locations that do include material.

This description is a non-limiting example only, and in some embodiments, the white and dark segments may have another meaning within the segmented design 200. In some embodiments, the segmented design 200 may include more than two colors. For example, a white segment may indicate a lack of material, a segment in a first color may indicate presence of a first material, and a segment in a second color may indicate a presence of a second material. In some embodiments, the segmented design 200 may be three-dimensional or one-dimensional, instead of the two-dimensional segmented design 200 illustrated in FIG. 2.

Typically, a fabrication system can duplicate any segmented design provided to it, subject to certain constraints. For example, a minimum feature size, a minimum feature shape, or any other constraint may be specified by the fabrication system as limitations on the segmented designs that the fabrication system can fabricate. From these constraints, a "paintbrush pattern" can be determined. In some embodiments, the paintbrush pattern represents a smallest feature that can be generated by a given fabrication system. If a given segmented design can be created by tiling the paintbrush pattern over the segmented design, then the segmented design is fabricable using the associated fabrication system. If one or more portions of the segmented design cannot be drawn with the paintbrush pattern, then the segmented design is not fabricable using the associated fabrication system. In some embodiments, if a fabrication system can fabricate devices with more than one material, separate constraints (and therefore separate paintbrush patterns) may be provided for each different material.

Figure 3:
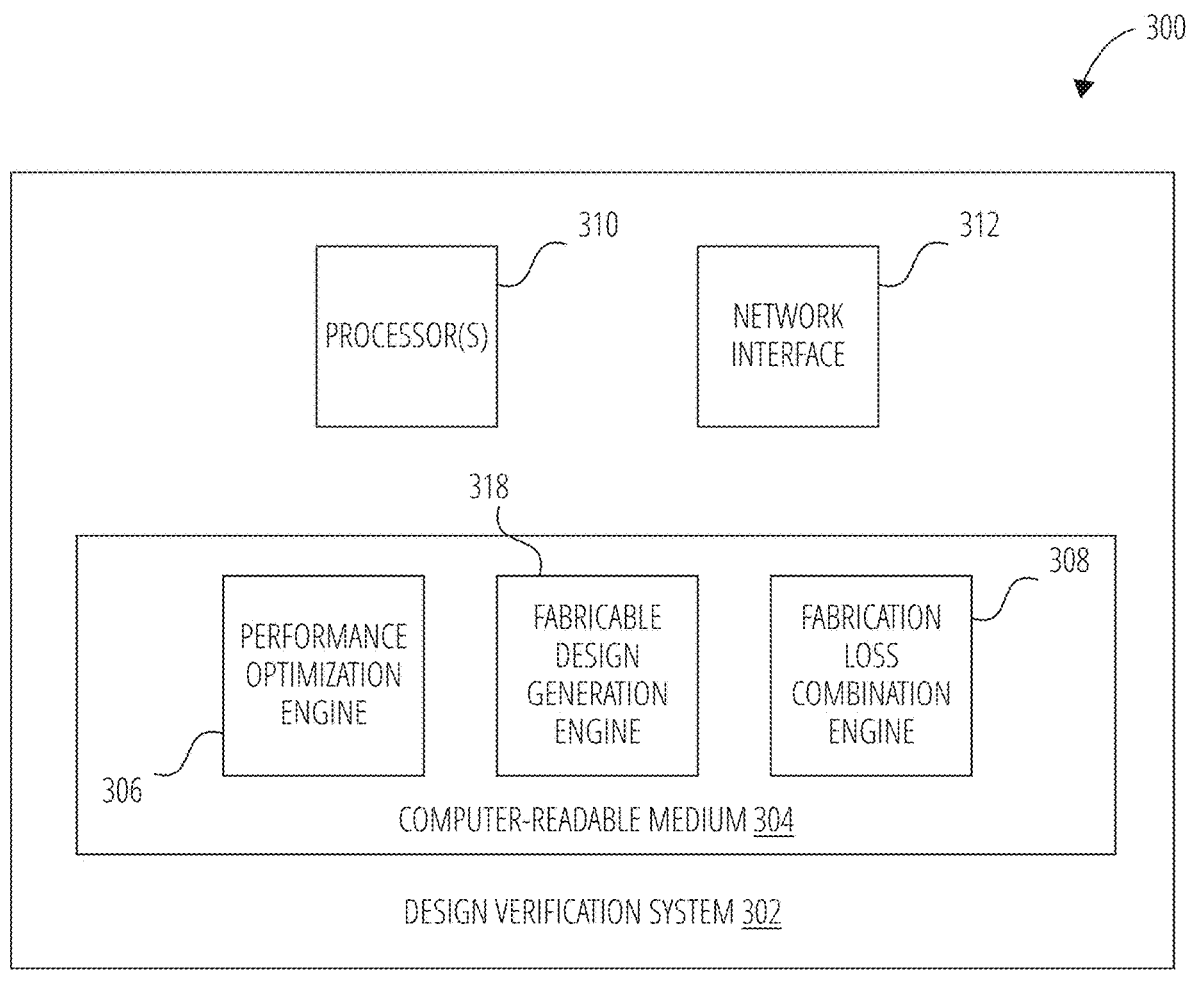
FIG. 3 is a block diagram that illustrates a non-limiting example embodiment of a system according to various aspects of the present disclosure.
Figure 3:
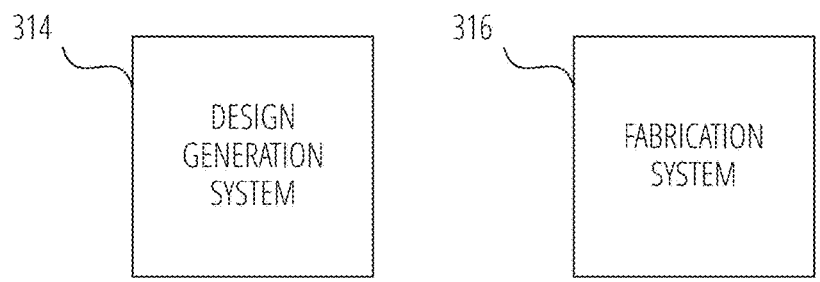

FIG. 3 is a block diagram that illustrates a non-limiting example embodiment of a system according to various aspects of the present disclosure. Overall, the illustrated embodiment of the system 300 is configured to generate design specifications, to determine fabricable segmented designs based on the design specifications, and to fabricate physical devices based on the fabricable segmented designs.

Typically, performance of the segmented designs generated by the system 300 is improved using an inverse design process as discussed above (or another process). Sometimes, using such an inverse design process to generate performant segmented designs is based on a performance loss, and is initially unconstrained by consideration of fabricability. While this can result in designs that are theoretically highly performant, it also often results in designs that cannot be fabricated due to physical limitations of the fabrication system to be used and/or the materials that make up the design. In some embodiments of the present disclosure, the system 300 uses convex functions to determine a fabrication loss value. The gradient of this fabrication loss value may be backpropagated as part of the inverse design process, and since it is convex, it will guarantee that a fabricable design will eventually be generated.

As shown, the system 300 includes a design generation system 314, a fabrication system 316, and a design verification system 302. Communication between the design generation system 314, the design verification system 302, and the fabrication system 316 may occur via a network (not pictured), via exchange of a removable computer-readable medium (not pictured), or via any other suitable technique. Though the design generation system 314, fabrication system 316, and design verification system 302 are illustrated as separate systems, in some embodiments, some portions of these systems may be combined. As one non-limiting example, the design generation system 314 and the design verification system 302 may be combined in a single system. Also, in some embodiments, systems illustrated in FIG. 3 as a single system may be broken into multiple systems.

In some embodiments, the design generation system 314 may include one or more computing devices that are configured to generate design specifications for segmented designs that achieve a desired result. For example, the design generation system 314 may use forward simulation and backpropagation techniques to generate a segmented design for an electromagnetic device (or any other type of physical device) that has desired characteristics. This is a non-limiting example only, and any other technique, including but not limited to manual design, may be used by the design generation system 314 to create design specifications.

In some embodiments, the fabrication system 316 may be any suitable system for fabricating a segmented design. In some embodiments, the fabrication system 316 may be a photolithography system or an additive manufacturing system. In some embodiments, the fabrication system 316 may have characteristics that include a minimum feature size, a minimum feature shape, and/or other constraints that help define the segmented designs that the fabrication system 316 is capable of fabricating. To that end, the fabrication system 316 may provide a design rule checker that is configured to process proposed segmented designs to determine whether the proposed segmented designs comply with the constraints of the fabrication system 316. The design rule checker may be used to determine one or more paintbrush patterns that represent patterns embody the minimum feature size and/or minimum feature shape fabricable by the fabrication system 316.

In some embodiments, the design verification system 302 may be any suitable computing device or collection of computing devices configured to provide the described functionality. In some embodiments, the design verification system 302 may be a server computing device, a desktop computing device, a laptop computing device, a mobile computing device, a tablet computing device, or one or more computing devices of a cloud computing system.

As shown, the design verification system 302 includes one or more processors 310, a network interface 312, and a computer-readable medium 304. In some embodiments, the one or more processors 310 may include a plurality of processors and/or a plurality of processing cores in order to provide a large amount of computing power. In some embodiments, the network interface 312 may be configured to communicate with the design generation system 314 and/or the fabrication system 316 via any suitable type of wired network (including but not limited to Ethernet, FireWire, and USB), wireless network (including but not limited to 2G, 3G, 4G, 5G, LTE, Wi-Fi, WiMAX, and Bluetooth), or combinations thereof. In some embodiments, instead of a network interface 312, the design verification system 302 may be configured to communicate with the design generation system 314 and/or the fabrication system 316 via transfer of a removable computer-readable medium (not shown).

As shown, the computer-readable medium 304 has stored thereon logic that, in response to execution by the one or more processors 310, cause the design verification system 302 to provide a performance optimization engine 306, a fabricable design generation engine 318, and a fabrication loss combination engine 308.

In some embodiments, the performance optimization engine 306 is configured to generate proposed segmented designs based on design specifications received from the design generation system 314. Typically, the performance optimization engine 306 uses an inverse design process that includes optimizing a performance loss value to generate the proposed segmented designs.

In some embodiments, the fabricable design generation engine 318 is configured to generate one or more fabricable segmented designs based on a given proposed segmented design that may or may not be fabricable. If the given proposed segmented design is already fabricable, then the fabricable design generation engine 318 may not make any changes. However, if the given proposed segmented design is not fabricable, then the fabricable design generation engine 318 may use a technique described below to remove unfabricable portions, thereby "snapping" the unfabricable proposed segmented design to a fabricable segmented design.

In some embodiments, the fabrication loss combination engine 308 is configured to determine differences between fabricable segmented designs and their corresponding proposed segmented designs, and to reduce the differences to a scalar value that represents a reduced fabrication loss value. In some embodiments, the fabrication loss combination engine 308 may also be configured to reduce multiple reduced fabrication loss values to create an overall fabrication loss value. The reduction functions used by the fabrication loss combination engine 308 are convex, thus ensuring that backpropagating the gradient of the overall fabrication loss value will push the proposed segmented design toward a fabricable design.

Further details of the configuration of the performance optimization engine 306, the fabricable design generation engine 318, and the fabrication loss combination engine 308 are provided below.

As used herein, "engine" refers to logic embodied in hardware or software instructions, which can be written in a programming language, such as C, C++, C#, COBOL, JAVA™, PHP, Perl, HTML, CSS, JavaScript, VBScript, ASPX, Go, Python, and/or the like. An engine may be compiled into executable programs or written in interpreted programming languages. Software engines may be callable from other engines or from themselves. Generally, the engines described herein refer to logical modules that can be merged with other engines, or can be divided into sub-engines. The engines can be implemented by logic stored in any type of computer-readable medium or computer storage device and be stored on and executed by one or more general purpose computers, thus creating a special purpose computer configured to provide the engine or the functionality thereof. The engines can be implemented by logic programmed into an application-specific integrated circuit (ASIC), a field-programmable gate array (FPGA), or another hardware device.

As used herein, "computer-readable medium" refers to a removable or nonremovable device that implements any technology capable of storing information in a volatile or non-volatile manner to be read by a processor of a computing device, including but not limited to: a hard drive; a flash memory; a solid state drive; random-access memory (RAM); read-only memory (ROM); a CD-ROM, a DVD, or other disk storage; a magnetic cassette; a magnetic tape; and a magnetic disk storage. A computer-readable medium may also include multiple devices configured to collectively store the information described.

Figure 4:
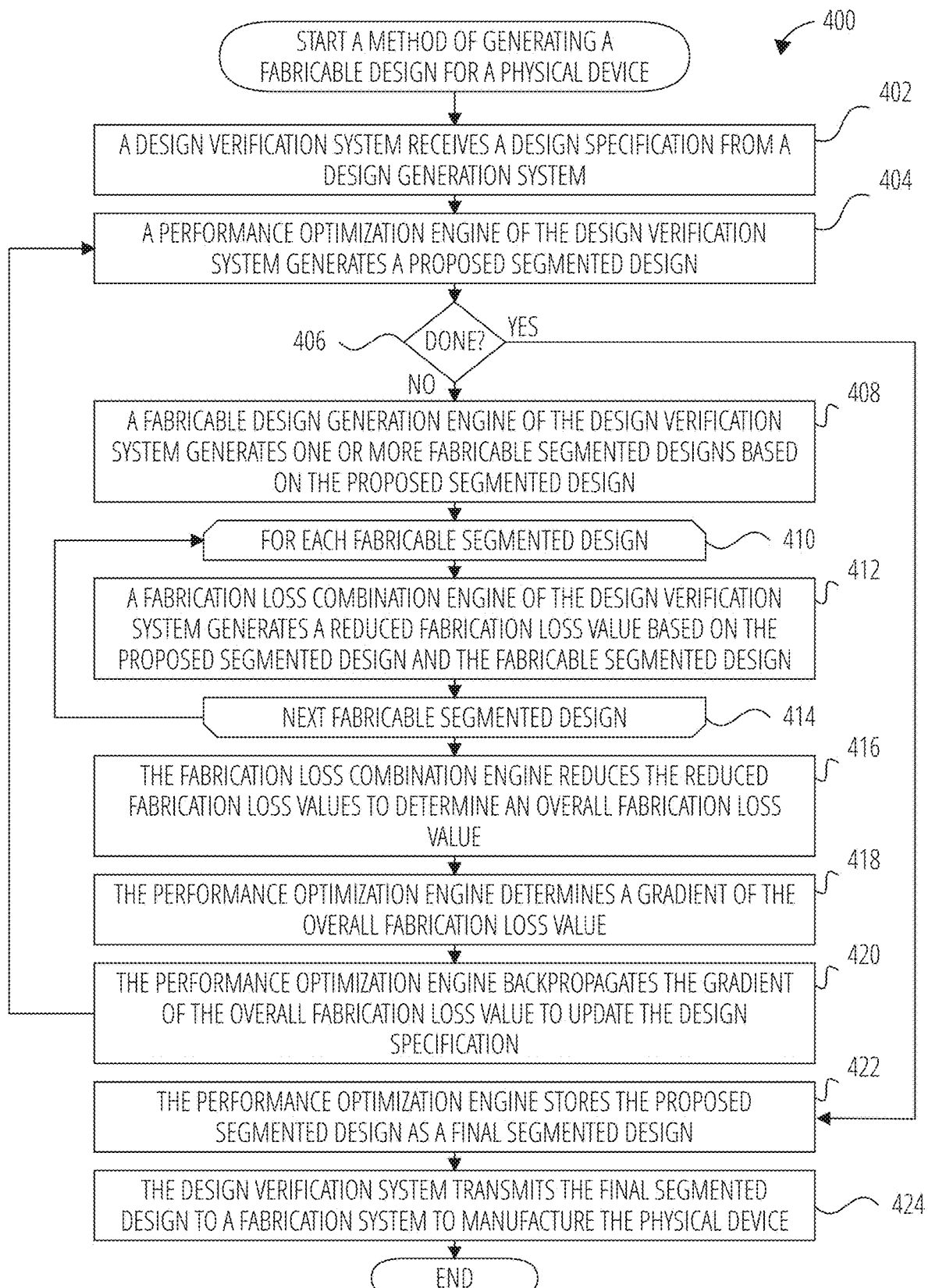
FIG. 4 is a flowchart that illustrates a non-limiting example embodiment of a method of generating a fabricable design for a physical device according to various aspects of the present disclosure.

FIG. 4 is a flowchart that illustrates a non-limiting example embodiment of a method of generating a fabricable design for a physical device according to various aspects of the present disclosure. In the method 400, the system 300 determines fabrication loss using a convex function, thus ensuring that iterating through a forward simulation/backpropagation technique will eventually arrive at a fabricable design without getting stuck in a local non-zero minimum of the fabrication loss.

From a start block, the method 400 proceeds to block 402, where a design verification system 302 receives a design specification from a fabrication system 316. In some embodiments, the design specification may include a segmented design generated randomly, generated using a naïve optimization technique, using a technique similar to those used by the performance optimization engine 306, generated manually, or generated using any other suitable technique. In some embodiments, the design specification may include a linear function that represents a desired characteristic of the physical device, instead of specifying a segmented design. In some embodiments, the design specification may also include an indication of the desired performance characteristics of the physical device. For example, the design specification may include a performance loss function to be used to evaluate the performance of segmented designs during optimization. As another example, the design specification may include one or more parameters, including but not limited to desired input and/or output wavelengths, to be used by a performance loss function built into the performance optimization engine 306.

At block 404, a performance optimization engine 306 of the design verification system 302 generates a proposed segmented design. Any suitable technique may be used by the performance optimization engine 306 to generate the proposed segmented design based on the design specification. As one non-limiting example, the forward-simulation/backpropagation technique described above in FIG. 1A-FIG. 1C may be used to create a proposed segmented design based on the design specification. In other examples, other techniques, including but not limited to other generative design techniques, genetic design techniques, or still other techniques may be used.

The method 400 then advances to decision block 406, where a determination is made regarding whether the proposed segmented design is acceptable and the method 400 is therefore done processing the design specification. In some embodiments, the determination regarding whether the proposed segmented design is acceptable based on whether a fabrication loss of the proposed segmented design meets a fabricability threshold. The performance optimization engine 306 may calculate the fabrication loss for the proposed segmented design, and then compare the calculated fabrication loss to the fabricability threshold. Typically, the fabricability threshold is configured to indicate whether the proposed segmented design is fabricable by the fabrication system 316. Accordingly, in some embodiments, any indication of a non-zero fabrication loss may fail to meet the fabricability threshold.

If the proposed segmented design is not yet acceptable, then the result of decision block 406 is NO, and the method 400 advances to block 408. At block 408, a fabrication loss combination engine 308 of the design verification system 302 generates one or more fabricable segmented designs based on the proposed segmented design. In some embodiments, the technique used to generate the fabricable segmented design may include some variability, in which case the fabrication system 316 may generate multiple slightly different fabricable segmented designs based on the single proposed segmented design. In some embodiments, the proposed segmented design may include likelihoods of various materials being present in a given segment (e.g., a given segment may have a 75% probability of containing a first material, and a 25% probability of containing a second material). In such embodiments, generating a fabricable segmented design may include binarizing the proposed segmented design to indicate that a given material is either definitively present or not present in any given segment.

Multiple techniques exist to convert the proposed segmented design to a fabricable segmented design. For example, the fabrication loss combination engine 308 may use paintbrush patterns associated with the fabrication system 316 to generate a fabricable segmented design based on the proposed segmented design. One such technique is described in commonly owned, co-pending U.S. application Ser. No. 16/805,299, filed Feb. 28, 2020, now U.S. Pat. No. 11,321,498, the entire disclosure of which is hereby incorporated by reference herein for all purposes. Other techniques are described in commonly owned, co-pending U.S. application Ser. No. 17/036,454, filed Sep. 29, 2020, now U.S. Pat. No. 11,157,163, and U.S. application Ser. No. 17/036,397, filed Sep. 29, 2020, now U.S. Pat. No. 11,158,096, the entire disclosures of which are hereby also incorporated by reference herein for all purposes.

The method 400 then advances to a for-loop defined between a for-loop start block 410 and a for-loop end block 414, wherein processing is performed for each of the one or more fabricable segmented designs. From the for-loop start block 410, the method 400 advances to block 412, where a fabrication loss combination engine 308 of the design verification system 302 generates a reduced fabrication loss value based on the proposed segmented design and the fabricable segmented design.

In some embodiments, the reduced fabrication loss value is a scalar value that represents an amount of difference between the proposed segmented design and the fabricable segmented design. For example, a fabrication loss matrix or array may be generated that includes each segment that is different between the proposed segmented design and the fabricable segmented design. In some embodiments, this array may have binary values that indicate whether a segment is different or the same in the fabricable segmented design compared to the proposed segmented design. In some embodiments, if the proposed segmented design has probability values for each segment instead of binary values, the array may store a difference between the probability value and the binarized value of the fabricable segmented design. For example, if the proposed segmented design indicates a 25% probability of the first material in a first segment and the fabricable segmented design indicates that the first material is not present in the first segment, then the array would store a value of 0.25 (0.25 [probability]−0 [binarized value]). Likewise, if the fabricable segmented design indicates that the first material is present in the first segment, then the array would store a value of −0.75 (0.25 [probability]−1 [binarized value]).

In some embodiments, the scalar value may be determined based on the resulting fabrication loss matrix using any suitable technique. For example, the scalar value may be a sum of values in the fabrication loss matrix. As another example, the scalar value may be a sum of squares of values in the fabrication loss matrix. As still another example, the scalar value may be an average of values in the fabrication loss matrix.

The method 400 then proceeds to the for-loop end block 414. If further fabricable segmented designs remain to be processed, then the method 400 returns from for-loop end block 414 to for-loop start block 410 to process the next fabricable segmented design. Otherwise, if processing of all of the fabricable segmented designs has completed, the method 400 proceeds from for-loop end block 414 to block 416.

At block 416, the fabrication loss combination engine 308 reduces the reduced fabrication loss values to determine an overall fabrication loss value. Any suitable technique may be used to further reduce the reduced fabrication loss values. For example, in some embodiments, the fabrication loss combination engine 308 may determine a minimum value of the reduced fabrication loss values, and may use the minimum value as the overall fabrication loss value. As another example, in some embodiments, the fabrication loss combination engine 308 may multiply the reduced fabrication loss values to create the overall fabrication loss value. In some embodiments, the fabrication loss combination engine 308 may use a reduce_min function to determine the overall fabrication loss value.

At block 418, the performance optimization engine 306 determines a gradient of the overall fabrication loss value, and at block 420, the performance optimization engine 306 backpropagates the gradient of the overall fabrication loss value to update the design specification. One feature to note is that in the techniques described above, the gradients of the fabrication loss of the individual fabricable segmented designs will have a zero value, because the fabricable segmented designs will represent minima of the fabrication loss. The techniques described above for reducing the arrays to create the overall fabrication loss value will therefore provide a convex measurement of fabrication loss, in that the overall fabrication loss value will have one global minimum, and the gradient of the overall fabrication loss value will always point toward a fabricable design.

The method 400 then returns to block 404 to create a proposed segmented design based on the updated design specification.

Returning to decision block 406, if the proposed segmented design had been determined to be acceptable, then the result of decision block 406 is YES, and the method 400 proceeds to block 422.

At block 422, the performance optimization engine 306 stores the proposed segmented design as a final segmented design, and at block 424, the design verification system 302 transmits the final segmented design to a fabrication system 316 to manufacture the physical device. The method 400 then proceeds to an end block and terminates.

In the preceding description, numerous specific details are set forth to provide a thorough understanding of various embodiments of the present disclosure. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The order in which some or all of the blocks appear in each method flowchart should not be deemed limiting. Rather, one of ordinary skill in the art having the benefit of the present disclosure will understand that actions associated with some of the blocks may be executed in a variety of orders not illustrated, or even in parallel.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A non-transitory computer-readable medium having logic stored thereon that, in response to execution by one or more processors of a computing system, causes the computing system to perform actions for creating a fabricable segmented design for a physical device, the actions comprising:
   receiving, by the computing system, a design specification;
   generating, by the computing system, a proposed segmented design based on the design specification;
   determining, by the computing system, one or more fabricable segmented designs based on the proposed segmented design;
   for each fabricable segmented design of the one or more fabricable segmented designs, generating a fabrication loss matrix that represents differences between the fabricable segmented design and the proposed segmented design by:
      comparing segments of the fabricable segmented design to corresponding segments of the proposed segmented design; and in response to detecting a difference between a material indicated by a segment of the fabricable segmented design and a material indicated by a corresponding segment of the proposed segmented design, adding a value that represents the difference between the material indicated by the segment of the fabricable segmented design and the material indicated by the corresponding segment of the proposed segmented design to the fabrication loss matrix:

determining, by the computing system, an overall fabrication loss value based on the fabrication loss matrices; and backpropagating, by the computing system, a gradient of the overall fabrication loss value to create an updated design specification.

2. The non-transitory computer-readable medium of claim 1, wherein determining the overall fabrication loss value based on the one or more fabrication loss matrices further includes reducing each separate fabrication loss matrix to a scalar value.

3. The non-transitory computer-readable medium of claim 2, wherein reducing each separate fabrication loss matrix to the scalar value includes at least one of:

determining a sum of values in the fabrication loss matrix;

determining a sum of squares of values in the fabrication loss matrix; and determining an average of values in the fabrication loss matrix.

4. The non-transitory computer-readable medium of claim 2, wherein determining the overall fabrication loss value based on the one or more fabricable segmented designs further includes reducing the scalar values to an overall scalar value.

5. The non-transitory computer-readable medium of claim 4, wherein reducing the scalar values to the overall scalar value includes at least one of:

determining a minimum value of the scalar values; and multiplying the scalar values.

6. The non-transitory computer-readable medium of claim 1, wherein the actions further comprise:

generating a new proposed segmented design based on the updated design specification.

7. The non-transitory computer-readable medium of claim 6, wherein the actions further comprise:

in response to determining that a fabrication loss of the new proposed segmented design fails to meet a fabricability threshold:

determining one or more new fabricable segmented designs based on the new proposed segmented design;

determining a new overall fabrication loss value based on the one or more new fabricable segmented designs; and backpropagating a gradient of the new overall fabrication loss value to create a second updated design specification.

8. The non-transitory computer-readable medium of claim 7, wherein determining the new overall fabrication loss value based on the one or more new fabricable segmented designs includes determining the new overall fabrication loss value based on the one or more new fabricable segmented designs and the one or more fabricable segmented designs.

9. The non-transitory computer-readable medium of claim 6, wherein the actions further comprise:

in response to determining that a fabrication loss of the new proposed segmented design meets a fabricability threshold, providing the new proposed segmented design to a fabrication system to manufacture the physical device.

10. A method of creating a fabricable segmented design for a physical device, the method comprising:

receiving, by a computing system, a design specification;

generating, by the computing system, a proposed segmented design based on the design specification;

determining, by the computing system, one or more fabricable segmented designs based on the proposed segmented design;

for each fabricable segmented design of the one or more fabricated segmented designs, generating a fabrication loss matrix that represents differences between the fabricable segmented design and the proposed segmented design by:

comparing segments of the fabricable segmented design to corresponding segments of the proposed segmented design; and in response to detecting a difference between a material indicated by a segment of the fabricable segmented design and a material indicated by a corresponding segment of the proposed segmented design, adding a value that represents the difference between the material indicated by the segment of the fabricable segmented design and the material indicated by the corresponding segment of the proposed segmented design to the fabrication loss matrix;

determining, by the computing system, an overall fabrication loss value based on the fabrication loss matrices; and backpropagating, by the computing system, a gradient of the overall fabrication loss value to create an updated design specification.

11. The method of claim 10, wherein determining the overall fabrication loss value based on the one or more fabrication loss matrices further includes reducing each separate fabrication loss matrix to a scalar value.

12. The method of claim 11, wherein reducing each separate fabrication loss matrix to the scalar value includes at least one of:

determining a sum of values in the fabrication loss matrix;

determining a sum of squares of values in the fabrication loss matrix; and determining an average of values in the fabrication loss matrix.

13. The method of claim 11, wherein determining the overall fabrication loss value based on the one or more fabricable segmented designs further includes reducing the scalar values to an overall scalar value.

14. The method of claim 13, wherein reducing the scalar values to the overall scalar value includes at least one of:

determining a minimum value of the scalar values; and multiplying the scalar values.

15. The method of claim 10, further comprising:

generating a new proposed segmented design based on the updated design specification.

16. The method of claim 15, further comprising:

in response to determining that a fabrication loss of the new proposed segmented design fails to meet a fabricability threshold:

determining one or more new fabricable segmented designs based on the new proposed segmented design;

determining a new overall fabrication loss value based on the one or more new fabricable segmented designs; and backpropagating a gradient of the new overall fabrication loss value to create a second updated design specification.

17. The method of claim 16, wherein determining the new overall fabrication loss value based on the one or more new fabricable segmented designs includes determining the new overall fabrication loss value based on the one or more new fabricable segmented designs and the one or more fabricable segmented designs.

18. The method of claim 15, further comprising:
in response to determining that a fabrication loss of the new proposed segmented design meets a fabricability threshold, providing the new proposed segmented design to a fabrication system to manufacture the physical device.

* * * * *